US007376739B2

(12) United States Patent
Ramaswamy et al.

(10) Patent No.: US 7,376,739 B2
(45) Date of Patent: May 20, 2008

(54) PERSISTENCE OF INTER-APPLICATION COMMUNICATION PATTERNS AND BEHAVIOR UNDER USER CONTROL

(75) Inventors: Shankar Ramaswamy, Chapel Hill, NC (US); Amber Roy-Chowdhury, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 747 days.

(21) Appl. No.: 10/776,040

(22) Filed: Feb. 11, 2004

(65) Prior Publication Data

US 2005/0175015 A1    Aug. 11, 2005

(51) Int. Cl.
*G06F 15/16* (2006.01)
*G06F 15/173* (2006.01)
*G06F 9/44* (2006.01)
*G06F 9/46* (2006.01)
*G06F 3/048* (2006.01)
*G06F 17/30* (2006.01)
*G06F 3/00* (2006.01)
*G06F 13/00* (2006.01)
*G06F 15/00* (2006.01)
*G06F 17/00* (2006.01)
*G06F 7/00* (2006.01)

(52) U.S. Cl. .................... 709/226; 709/218; 709/219; 709/249; 719/328; 715/749; 715/760; 715/811; 707/10

(58) Field of Classification Search ........ 709/217–219, 709/226, 229, 249; 719/328; 715/513, 514, 715/704, 749, 760, 809–813; 707/10
See application file for complete search history.

(56) References Cited

U.S. PATENT DOCUMENTS 6,918,088 B2 *  7/2005  Clark et al. ................. 715/742

(Continued)

FOREIGN PATENT DOCUMENTS

EP          961452 A2 *  12/1999

(Continued)

OTHER PUBLICATIONS

Abdelnur, Alejandro and Hepper, Stefan. "Java Portlet Specification, Version 1.0," Oct. 7, 2003, pp. 1-132.*

(Continued)

*Primary Examiner*—Jason D Cardone
*Assistant Examiner*—Melvin H Pollack
(74) *Attorney, Agent, or Firm*—VanLeeuwen & VanLeeuwen; Andre M. Gibbs

(57) ABSTRACT

An end-user or administrator is allowed to couple portlets in a portal through user interface events taking place on the portal display itself. When the portal is displayed, if the user actuates a control corresponding to a property in a portlet, a menu of actions that can be performed with that data by other portlets is provided to the user. In addition to this "conventional" manner, an alternative manner of actuating the component is provided to the user such that if the user actuates the control in this alternative manner, the user is provided the option of making the chosen action "persistent," so that the next time the control is actuated by the user, or the associated property is otherwise produced, the chosen action is performed automatically, without requiring the user to choose an action.

20 Claims, 13 Drawing Sheets

U.S. PATENT DOCUMENTS

| | | | | |
|---|---|---|---|---|
| 6,950,990 | B2* | 9/2005 | Rajarajan et al. | 715/736 |
| 6,950,991 | B2* | 9/2005 | Bloomfield et al. | 715/738 |
| 6,981,263 | B1* | 12/2005 | Zhang et al. | 719/310 |
| 6,990,653 | B1* | 1/2006 | Burd et al. | 717/108 |
| 7,089,560 | B1* | 8/2006 | Uhler et al. | 719/311 |
| 7,103,642 | B1* | 9/2006 | Chen et al. | 709/218 |
| 7,107,543 | B2* | 9/2006 | Berry et al. | 715/749 |
| 7,111,060 | B2* | 9/2006 | Araujo et al. | 709/224 |
| 7,146,563 | B2* | 12/2006 | Hesmer et al. | 715/507 |
| 7,167,448 | B2* | 1/2007 | Wookey et al. | 370/231 |
| 7,188,112 | B1* | 3/2007 | Lindquist et al. | 707/10 |
| 7,194,683 | B2* | 3/2007 | Hind et al. | 715/522 |
| 7,200,804 | B1* | 4/2007 | Khavari et al. | 715/513 |
| 7,203,909 | B1* | 4/2007 | Horvitz et al. | 715/765 |
| 7,210,098 | B2* | 4/2007 | Sibal et al. | 715/513 |
| 7,216,351 | B1* | 5/2007 | Maes | 719/328 |
| 7,231,608 | B1* | 6/2007 | Fano et al. | 715/760 |
| 7,240,280 | B2* | 7/2007 | Jolley et al. | 715/513 |
| 7,240,296 | B1* | 7/2007 | Matthews et al. | 715/840 |
| 7,246,324 | B2* | 7/2007 | Mikhail et al. | 715/760 |
| 7,277,924 | B1* | 10/2007 | Wichmann et al. | 709/217 |
| 7,281,060 | B2* | 10/2007 | Hofmann et al. | 709/246 |
| 7,281,202 | B2* | 10/2007 | Croney et al. | 715/255 |
| 7,299,274 | B2* | 11/2007 | Rajarajan et al. | 709/223 |
| 7,310,677 | B1* | 12/2007 | Cohen et al. | 709/229 |
| 7,313,621 | B2* | 12/2007 | Gudorf et al. | 709/227 |
| 2003/0110448 | A1* | 6/2003 | Haut et al. | 715/513 |
| 2004/0133660 | A1* | 7/2004 | Junghuber et al. | 709/219 |
| 2004/0216036 | A1* | 10/2004 | Chu et al. | 715/501.1 |
| 2004/0243577 | A1* | 12/2004 | Choudhary et al. | 707/6 |
| 2004/0268288 | A1* | 12/2004 | Bajuk et al. | 716/16 |
| 2005/0071853 | A1* | 3/2005 | Jones et al. | 719/328 |
| 2006/0031222 | A1* | 2/2006 | Hannsmann | 707/10 |

FOREIGN PATENT DOCUMENTS

| | | | |
|---|---|---|---|
| EP | 967558 A2 | * | 12/1999 |
| JP | 2000090058 A | * | 3/2000 |
| JP | 2000222297 A | * | 8/2000 |

OTHER PUBLICATIONS

Allen, Rob et al. "Portals and Portlets 2003," CCLRC e-Science Centre, Jul. 14-17, 2003, pp. 1-38.*

Wege, Christian. "Portal Server Technology," IEEE Internet Computing, vol. 6, Issue 3, May/Jun. 2002, pp. 73-77.*

Samaras, George and Panayiotou, Christoforos. "Personalized Portals for the Wireless User Based on Mobile Agents," 2nd Intl. Workshop on Mobile Commerce, 2002, pp. 70-74.*

Rossi, Gustavo et al. "Designing Personalized Web Applications," 10th Intl. Conference on the World Wide Web, 2001, pp. 275-284.*

Maglio, Paul and Barrett, Rob. "Intermediaries Personalize Information Streams," Communications of the ACM, vol. 43, Issue 8, Aug. 2000, pp. 96-101.*

Smyth, Barry and Cotter, Paul. "A Personalized Television Listings Service," Communications of the ACM, vol. 43, Issue 8, Aug. 2000, pp. 107-111.*

Murray, M. "An Investigation of Specifications for Migrating to a Web Portal Framework for the Dissemination of Health Information Within a Public Health Network," Proceedings of the 35th Annual Hawaii International Conference on System Sciences, Jan. 10, 2002, pp. 1917-1925.*

Will, R. et al. "WebSphere Portal: Unified User Access to Content, Applications and Services," IBM Systems Journal, vol. 43, No. 2, 2004, pp. 420-429.*

Barrett, Rob et al. "How to Personalize the Web," Proceedings of the SIGCHI Conference on Human Factors in Computing Systems, 1997, pp. 75-82.*

U.S. Appl. No. 10/292,074, filed Nov. 12, 2002, Dunne et al.

U.S. Appl. No. 10/448,968, filed May 30, 2003, Choudhary et al.

* cited by examiner

| SYMBOL | MEANING |
|---|---|
|  | ENTITY |
|  | WEAK ENTITY |
|  | RELATIONSHIP |
|  | IDENTIFYING RELATIONSHIP |
|  | ATTRIBUTE |
|  | KEY ATTRIBUTE |
|  | MULTIVALUED |
|  | COMPOSITE ATTRIBUTE |
|  | DERIVED ATTRIBUTE |
|  | TOTAL PARTICIPATION OF $E_2$ IN R |
|  | CARDINALITY RATIO 1:N FOR $E_1$:$E_2$ IN R |

PERSISTENCE OF INTER-APPLICATION COMMUNICATION PATTERNS AND BEHAVIOR UNDER USER CONTROL

BACKGROUND OF THE INVENTION

1. Technical Field

The present invention relates in general to a system and method for integrating applications based upon a user's actions. More particularly, the present invention relates to a system and method of integrating portlets so that source portlets are able to automatically provide data to target portlets.

2. Background Art

The portal market is one of the fastest growing markets of computer software. A portal, in the context of a preferred embodiment of the present invention, may be defined as an application that provides a secure, single point of interaction with diverse information, business processes, and people, personalized to a user's needs and responsibilities. A portal, or "Web portal," is a Web site or service that offers a broad array of resources and services, such as e-mail, forums, search engines, and on-line shopping malls. Portals are typically accessed by a user on the Internet using a software application, such as a Web browser. A Web browser, or "browser," is a software application used to locate and display Web pages. Two popular browsers are NETSCAPE NAVIGATOR™ and MICROSOFT INTERNET EXPLORER™. Both of these are graphical browsers, which means that they can display graphics as well as text. In addition, most modern browsers can present multimedia information, including sound and video, though they often require plug-ins in order to handle some formats.

The demand for portals drives rapid development of new technologies by different portal vendors in order to place their products in advantageous market positions. Not surprisingly, portals have evolved to their current state from a more primitive beginning. Originally, portals were mainly used as access points to different information sources with content being chosen by the portal operator. Next, portal customization provided users with the ability to choose the content that was displayed on the user's view of the portal using a Web browser. In this phase, the user was able to select information according to the user's interests and retrieve information related to his or her interests more expeditiously. Customized information delivery led to the introduction of business, or corporate, portals. Business portals were introduced to provide intra-business data within an organization.

The ongoing evolution of portals also left its footprint in the architecture of portal products. At first, portal-like products were delivered as pre-packaged applications that could be installed out of the box and included standard applications, which provided the portal functionality. As new applications were needed, vendors extended their products in order to satisfy requirements of the new applications. Due to the use of proprietary designs, portal vendors added exclusive functionality to their portals, tying the success of a portal to the applications that the portal included. This led to the decomposition of monolithic portal structures and the creation of portal frameworks.

Portal products offered today employ architectures whereby the portal itself only implements standard functionality, such as security, authorization, authentication, aggregation, caching, user management, enrollment, rendering, and the like. The portal provides the infrastructure to integrate other application components. A typical embodiment of this type of architecture includes APIs for integrating applications so that applications from different vendors can be used so long as they match the portal product's API. According to current computing jargon, these applications are commonly called "portlets." Other synonyms for "portlets" in current use in the art include 'iViews' (a term utilized by SAP AG of Walldorf, Germany) or 'web parts' (a term utilized by Microsoft, Inc. of Redmond, Wash.).

Portlets are components that can be added to portals and are designed to run inside a portal's portlet container. Portlets may provide different functions ranging from simple rendering of static or dynamic content to application functions such as e-mail, electronic calendaring, and the like. Portlets are invoked indirectly via the portal infrastructure and produce content that is suited for aggregation in larger pages.

While portlets allow separation of application components from each other and from the underlying portal, a challenge of using portlets is the difficulty in transmitting data that appears on one portlet to another portlet. For example, if one portlet displays orders for an organization and another portlet displays details for orders, vendors would have to "couple" the portlets to allow the user to send data from one portlet to another. In a business system, many portlets may be driven from the same pieces of information, such as order numbers, account numbers, and customer numbers. Closely coupling portlets to one another increases development requirements and maintenance of each portlet. In addition, coupling portlets may require activation of each of the coupled portlets even though the user only wants to view a subset of the coupled portlets.

In commonly assigned and copending application U.S. Ser. No. 10/448,968 (CHOUDHARY, ET AL.) May 30, 2003, entitled "System and Method for User Driven Interactive Application Integration," a manner of using information from a first portlet in performing an action in a second portlet, referred to as "Click-to-Action" is disclosed. When a user selects one of the "Click-to-Action" icons or controls displayed in a Source portlet, he or she sees a menu of actions invocable with respect to target portlets on the page that can process the properties (i.e., data items) that the icon or control is associated with. The user selects one of the actions from the menu, which results in a request being delivered to a Target portlet to perform the given action. The "Click-to-Action" feature described in the CHOWDHURY, ET AL. patent application, however, does not provide a way to persistently couple portlets.

In another commonly-assigned copending patent application, U.S. Ser. No. 10/292,074 (DUNNE, ET AL.) Nov. 12, 2002, a tool for allowing a user or administrator to couple portlets through a web-based interface was described. The DUNNE, ET AL. application describes the creation of "wires." A wire, as the term is used in the DUNNE, ET AL. application and herein, is a persistent association between a property in a source portlet and an action in a target portlet. When an event occurs that affects the property of a wire, the action associated with that property is triggered.

Although DUNNE, ET AL. tool significantly enhanced a user's ability to custom-configure a portal interface, one drawback to the tool was that a user would have to first interact with the portlets on the portal page itself, or in complex cases read additional documentation, then navigate to a separate tool interface display in order to couple or de-couple portlets. In a moderately complex portal, a user might have to switch back and forth between the portal and the tool interface a number of times in order to complete the user's configuration of the portal, which can be inconvenient.

What is needed, therefore, is a system and method for allowing a user to couple portlets without having to switch back and forth between a tool interface display and the portal itself.

SUMMARY OF THE INVENTION

The present invention provides a method, computer program product, and apparatus for allowing an end-user or administrator to couple portlets in a portal so that information may be shared between the portlets. In particular, a preferred embodiment of the present invention provides a simplified interface through which portlets may be coupled through user interface events taking place on the portal display itself. A database stores information about the data items (called "properties") produced and consumed by the portlets.

When the portal is displayed, if the user actuates a control corresponding to a property in a registered portlet, a menu of actions that can be performed with that data by other portlets is provided to the user. In addition to this "conventional" manner of actuating the component, an alternative manner of actuating the component is provided to the user such that if the user actuates the control in this alternative manner, the user is provided the option of making the chosen action "persistent," so that the next time the control is actuated by the user, or the associated property is otherwise produced, the chosen action is performed automatically, without requiring the user to choose an action.

BRIEF DESCRIPTION OF DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF PREFERRED EMBODIMENT(S)

Figure 1:
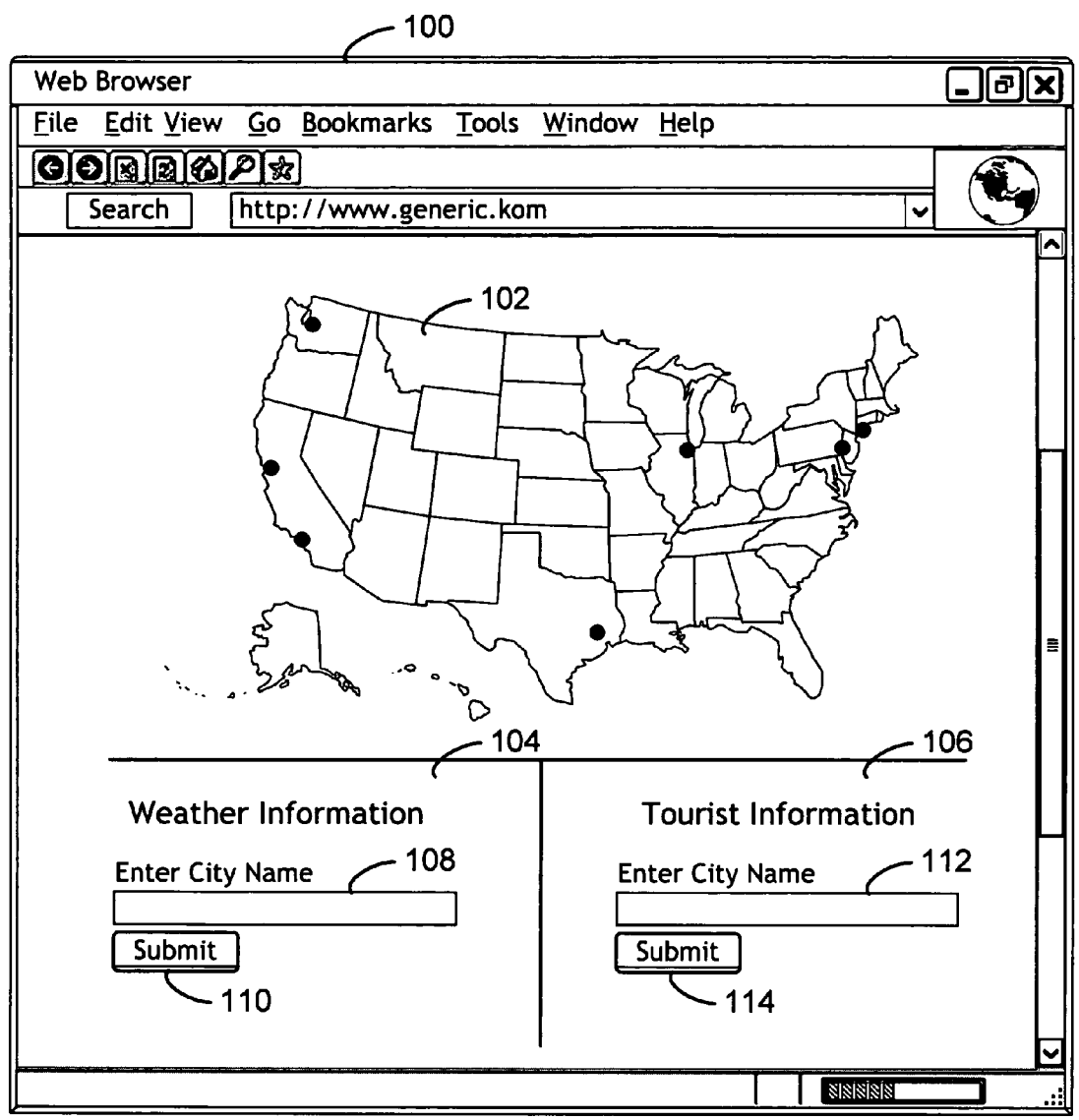
FIG. 1 is a diagram of a web browser displaying a portal page in accordance with a preferred embodiment of the present invention.

Turning now to FIG. 1, an exemplary web browser 100 is provided in accordance with a preferred embodiment of the present invention. Web browser 100 is shown displaying a portal page. Included within this portal page are a number of portlets, map portlet 102, weather information portlet 104, and tourist information portlet 106. Each of map portlet 102, weather information portlet 104, and tourist information portlet 106 is a separate web-based application executing on the web application server hosting the portal, and each portlet provides different, but related information. For example, weather information portlet 104 provides a text entry field 108 for entering the name of the city. When the user clicks submit button 110, the current contents of portlet 104's portion of the display is replaced with information about the current weather conditions in the city specified in text entry field 108. Likewise, when the user clicks submit button 114 in tourist information portlet 106, the current contents of portlet 106's portion of the display is replaced with tourism-related information regarding the city entered in text entry field 112.

Figure 2:
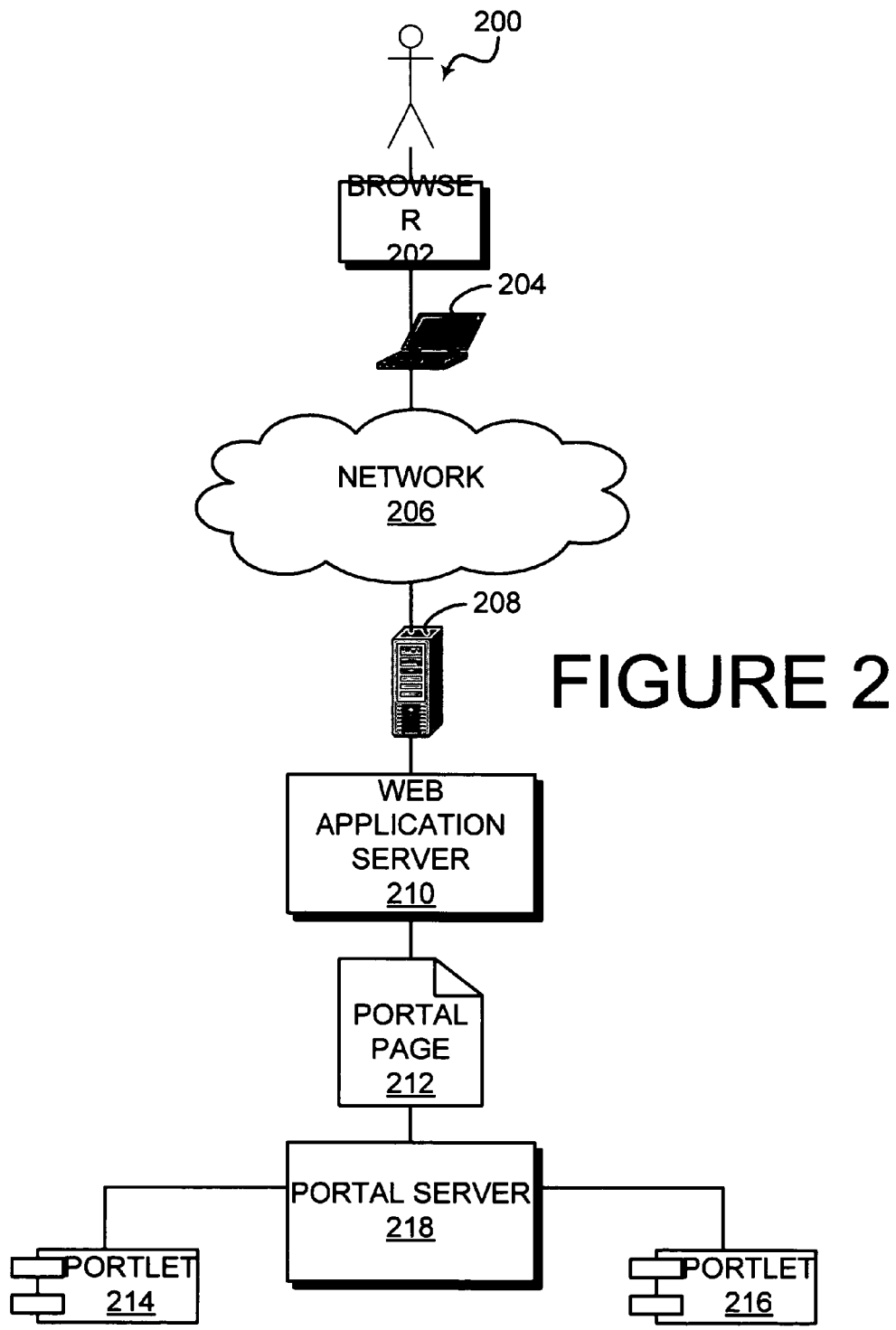
FIG. 2 is a diagram depicting an overall view of the operation of a portal infrastructure in which a preferred embodiment of the present invention may be implemented.

FIG. 2 is a diagram depicting an overall view of the operation of a portal infrastructure in which a preferred embodiment of the present invention may be implemented. Actor 200 is the user of a web browser 202 executing on client computer 204. Browser 202 issues requests through network 206 to web server 208. A web application server 210 resides on web server 208 and serves requested pages to browser 202. A web application server can execute applications that access back-end systems and generate web content. Web application servers can either integrate web serving capability, as in the example provided in FIG. 2, or be used in a configuration where the traditional web serving is offloaded to a web server, where the web application server is only forwarded some of the requests, based on the incoming Uniform Resource Locator (URL). One example of a web application server product that may operate in the context of a preferred embodiment of the present invention, either in conjunction with a web server or as an integrated web application server, is WEBSPHERE APPLICATION SERVER, which is a product of International Business Machines Corporation of Armonk, N.Y.

Web application server 210 is shown serving a portal page (portal interface 212) generated via portal server 218. Portal server 218, is a specialized application to which requests for a portal (indicated, in a preferred embodiment, by URLs having a certain prefix) are handed over for processing.

Since, from the perspective of web application 210, portal server 218 is an application like any other web application, web application server 210 may invoke portal server 218 through any of a number of standard web application interfaces, such as the widely-used JAVA® servlets interface standard, for example. Portal server 218 processes portlets (such as portlets 214 and 216), aggregates their markup, adds additional header/footer/formatting markup, and returns a resulting portal page 212 to web application server 210. In a preferred embodiment, portal server 218 is implemented as WEBSPHERE PORTAL SERVER, which is also a product of International Business Machines Corporation of Armonk, N.Y., and which is executed on a WEBSPHERE APPLICATION SERVER platform. One of ordinary skill in the art will recognize, however, that various portal servers are available from a number of vendors, and that the present invention is not limited to the use of any particular portal server, web server, or web application server.

Portlets 214 and 216 are two portlets that make up a portal served by web application server 210. In a preferred embodiment portlets 214 and 216 are implemented in the form of specialized servlets. However, Hypertext Markup Language (HTML) or extensible HTML (XHTML) pages with embedded server-side scripting code and/or server-side includes (SSIs) may also be used in alternative embodiments of the present invention.

A preferred embodiment of the present invention makes use of what is known as the "servlet" paradigm of web application development, where "servlets" house the program control logic. A servlet is a piece of code that follows certain standard APIs (application programming interfaces) that allow it to be invoked by a web application server. Usually, the term "servlet" is used in conjunction with the JAVA® programming language of Sun Microsystems, Inc., although those skilled in the art will recognize that the term may be applied in the context of other programming languages and run-time environments, as well, and it is in this more general sense that the term "servlet" is used in this document. In a typical JAVA® based implementation of a web application, however, servlets are used to house the program control logic of the application, JAVA® Server Pages (JSPs) are used to create the view (i.e., what is displayed to the user), and JavaBeans are created and passed to the JSPs by the servlets in order to allow the JSP-generated view to reflect the computational results and/or the computational state of the servlets.

Servlets, JSPs, and JavaBeans allow the design of a web application to be decomposed cleanly according to a model-view-controller (MVC) pattern. MVC is a manner of partitioning the design of interactive software into conceptual levels of abstraction that fall into the three categories of "model," "view," and "controller". In general, the "model" represents the internal data of the program and the relationships between the data, the "view" represents how a user views the state of the model, and the "controller" is represents the manner in which the user changes the state or provides input. The data and code encapsulation provided by servlets, JSPs, and JavaBeans simplifies the design of web applications by allowing the applications to conform to an MVC design pattern.

"Server-side scripting code" is program code that is directly embedded into the content of an HTML/XHTML document through the use of special markup tags. When a web page with server-side scripting code is served by a web server, the web server identifies the presence of server-side scripting code and causes the code to be executed before the web page is transmitted to the client. Typically, server-side scripting code is used to place dynamic content into a web page before the page is transmitted to a web client. A number of server-side scripting languages and programming tools are available in the art. Java Server Pages (JSP), for example, is a technology (available from Sun Microsystems, Inc.) that allows Java program code to be embedded in an HTML document for server-side execution. Other server-side programming systems include Active Server Pages (a product of Microsoft, Inc.) and PHP, which is a popular open-source programming language and interpreter for producing server-side scripting code. "Server-side include" (SSI) is a similar mechanism for placing dynamic text in web documents in which the web server replaces special tags in a source HTML/XHTML document with other text and/or markup (such as a time/date stamp or the contents of another HTML file, for example). The popular Apache open-source web server provides SSI capabilities. Server-side scripting and server-side includes were designed as a simplification over previous forms of providing dynamic web content, such as CGI (Common Gateway Interface) scripting, which are less commonly used today as a result. One of ordinary skill in the art will recognize that although a preferred embodiment of the present invention utilizes servlets, one may also practice the teachings of the present invention using other forms of dynamic content production, including server-side scripting and CGI, without departing from the scope and spirit of the present invention.

Portal server 218, in a preferred embodiment, combines the data and program content of portlets 214 and 216 by simply consolidating the raw source HTML/XHTML (including any server-side scripting code or SSIs) into a single HTML/XHTML document with some additional "glue/wrapper" HTML/XHTML markup to specify the arrangement of portlets on portal page 212. The additional markup may itself be quite significant to the operation of the portal, and can include (in addition to markup for arranging portlet views and in a non-limiting sense), headers, footers, portal navigation links, links to common services, search bars, client-side executable code (such as JavaScript, q.v.), and the like.

Portal page 212 is served to browser 202 (via web/application server 210 in this preferred embodiment) as if it were a monolithic page. Since server-side scripting code for both portlets 214 and 216 is included in portal page 212, web application server 210 may execute whatever server-side scripting code is present in portal page 212 as if the page were originally written as a single HTML/XHTML page with server-side scripts. Web application server 210 then serves the resulting page (with server-side scripts processed) to browser 202. Alternatively, the server-side scripting code may be executed prior to assembly of portal page 212 from its constituent portlets. For example, in a preferred embodiment utilizing WEBSPHERE PORTAL SERVER, portal server 218 runs as an application within web application server 210 and utilizes the JSP processor of web application server 210 to execute the JSP scriptlets for portlets 214 and 216 individually prior to the assembly of portal page 212, so that no post-processing of the assembled portal page 212 by web application server 210 is necessary.

One of ordinary skill in the art will recognize that an alternative method of serving dynamic portal content would be to execute each of portlets 214 and 216 as a separate process (for example, as separate CGI scripts) to obtain HTML/XHTML output and then consolidate the output of the two portlets into a single HTML/XHTML page for serving to browser 202. One of ordinary skill in the art will also recognize the content served to browser 202 need not be HTML/XHTML content, but may comprise any of a number of content types presently in existence or developed in the future. For example, the content produced by portal 214 may be in a format based on the extensible Markup Language (XML), such as extensible Stylesheet Language-Formatting Objects (XSL-FO), Scalable Vector Graphics (SVG), or Wireless Markup Language (WML). In addition the content types produced by the different portlets need not be homogeneous. For example, portlet 214 may produce an SVG graphic while portlet 216 produces a document in PDF (Portable Document Format). PDF is a published document format produced by Adobe, Inc.

Figure 3:
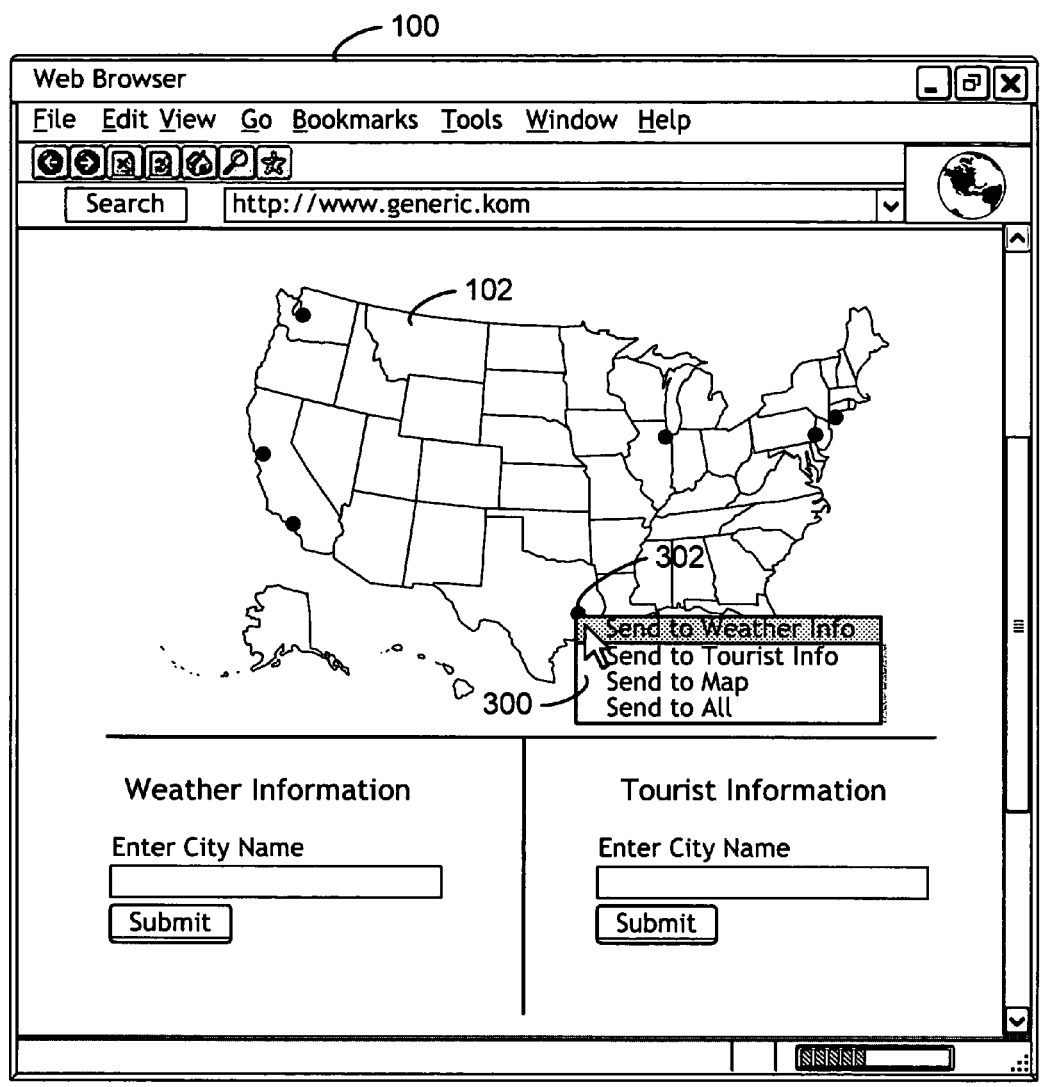
FIG. 3 is a diagram depicting the operation of a "Click-to-Action" operation from the perspective of an end-user in accordance with a preferred embodiment of the present invention.

The present invention is directed to a method, computer program product, and data processing system for allowing a user to couple or "wire" a pair of portlets to allow information to be shared between portlets on a portal page in the context of using the portlets. FIG. 3 is a diagram of a web browser displaying a portal having portlet wiring capabilities in accordance with a preferred embodiment of the present invention. In this preferred embodiment, the user interface controls provided by the portlets can be actuated in two alternative manners, a "conventional manner" and an "alternative manner." When a portlet control is actuated in the "conventional" manner, the portlet exhibits its normal behavior. For example, the normal behavior of map portlet 102 would be to display a menu (such as menu 300 in FIG. 3), and allow the user to select an action (or actions) to be taken in response to that menu selection (e.g., display city information on map portlet 102, display weather information for the selected city on portlet 104, etc.). The "Click-to-Action" techniques described in U.S. Ser. No. 10/448,968 (CHOUDHARY, ET AL.) May 30, 2003, hereby incorporated herein by reference, may be applied to achieve this behavior.

When a portlet control is actuated in the "alternative" manner, the user is given also provided with a menu of action choices, but prior to dispatching the selected action, an additional dialog is shown. This additional dialog asks the user whether or not to "persist" the selected action (i.e., by wiring the property corresponding to the actuated portlet control to an action to be performed by a target portlet). According to our terminology, a "property" is a data item that is produced by, consumed by, stored by, or otherwise associated with a portlet. For instance, in the example provided in FIG. 3, if the user holds down the "Control" (or "Ctrl") key while clicking on city 302 in map portlet 102 (as opposed to simply clicking city 302 with no keypress), a menu 300 is displayed to allow the information represented by city 302 (i.e., "Houston, Tex.") to be provided to the same or another portlet to perform an action. For example, menu 300 gives the user the option of sending the information to weather information portlet 104, tourist information portlet 106, map portlet 102, or to all three portlets.

Figure 4:
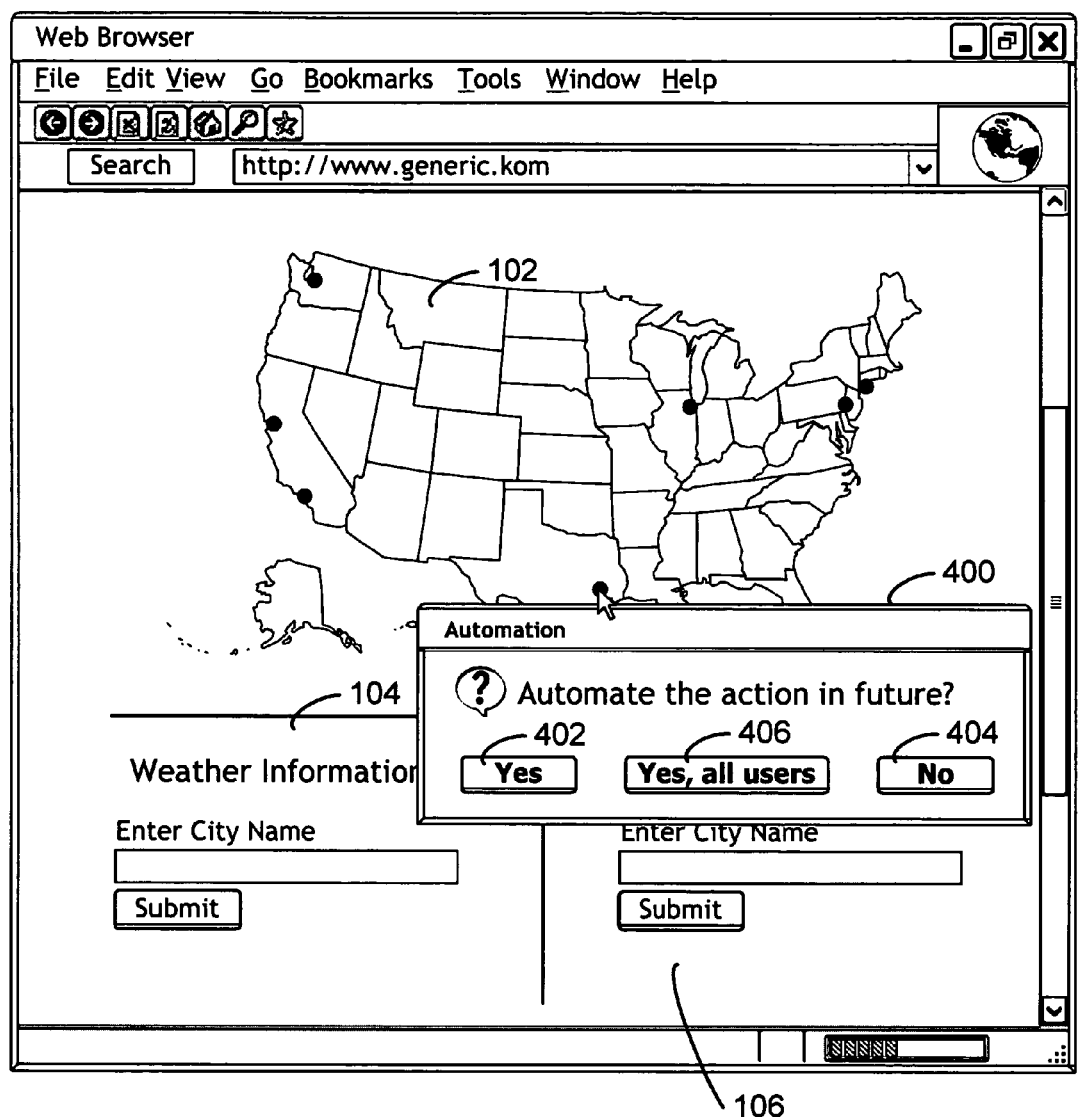
FIG. 4 is a diagram depicting a dialog box for prompting the user to specify whether to make a particular portlet action persistent in accordance with a preferred embodiment of the present invention.
Figure 5:
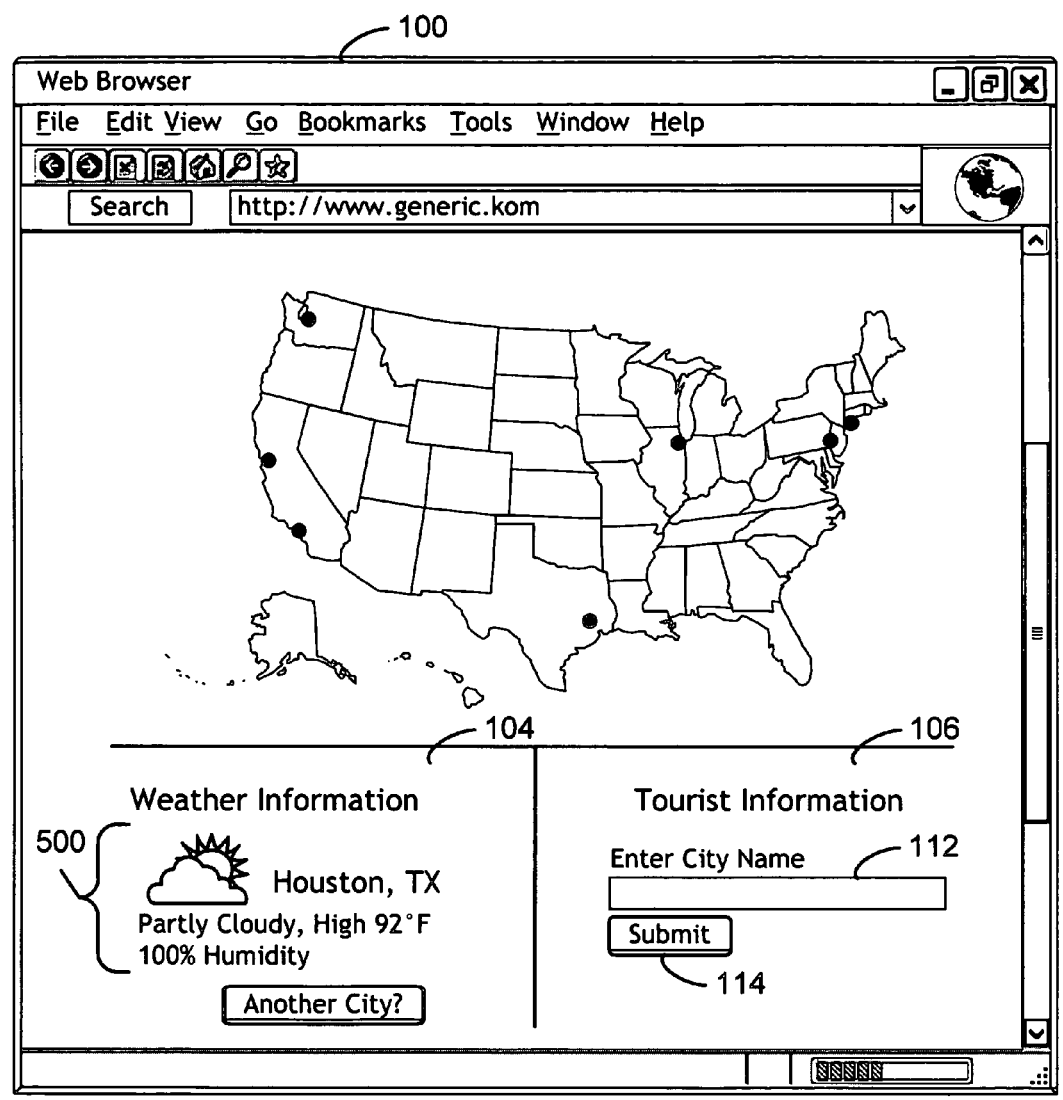
FIG. 5 is a diagram depicting the result of associating a portlet action with a property in accordance with a preferred embodiment of the present invention.

Once the user has made a selection of an action, the user is then prompted to specify whether to make that action "persistent." That is, the user is given the option of having that action be associated with the user interface control or property in the future. In FIG. 4, for instance, a dialog box 400 is displayed in response to the user's selecting a particular action (for example, sending the city information from map portlet 102 to weather information portlet 104). If the user clicks "Yes" button 402, the selected action will be associated with the city information from map portlet 102 such that whenever a city on map portlet 102 is clicked, the identity of that city is submitted to one or more of portlets 102, 104, and 106. For the purpose of example, we will assume that the user selected that the information be submitted to weather information portlet 104 so that whenever a city is clicked (such as city 302), that city's current weather report 500 is displayed by weather information portlet 104, as depicted in FIG. 5. According to our terminology, weather information portlet 104 is said to be "wired" to map portlet 102; by associating the city information from map portlet 102 with the city submission and weather reporting action of weather information portlet 104, the user is said to have created a "wire" coupling the two portlets.

Returning now to FIG. 4, the display of dialog box 400 may be triggered by the use of client-side scripting code embedded in the HTML/XHTML code for the portal. Unlike server-side scripting code (such as JSP or PHP code), client-side scripting code is transmitted in raw, unprocessed form to the user's browser. The browser then executes the embedded code. JavaScript is a popular client-side scripting language that is supported by most modern web browsers in current use. JavaScript and other client-side scripting languages generally allow certain procedures, function, or other client-side scripting code to be associated with user-interface events in the browser such that when a particular user interface event (such as a mouse click) occurs, particular lines of client-side scripting code are executed. Thus, one method of triggering dialog box 400 is to embed client-side scripting code (e.g., JavaScript code) into the portal page that is triggered by the user interface event of "Control-clicking" on particular controls in the portal page. The client-side scripting code displays the dialog box and communicates the user's response back the web application server to direct further processing. In a preferred embodiment of the present invention, the client-side scripting code is added to the portal page by the portal server in the process of assembling the component portlets into a single portal page.

Other options are provided by dialog box 400 in FIG. 4. The user has the option of deciding to perform the associated action for a single time only, in which case, the user may click "No" button 404 to opt out of creating a wire and to exit dialog box 400. If the user has administrative privileges with respect to the web application server hosting the portal, an additional "Yes, all users" button 406 may also be provided in order to allow that administrative user to create a wire that holds for all users of a portal. One of ordinary skill in the art will recognize that it is not unusual for websites to require their end-users to log in with a user name and/or password in order to access certain services or in order to provide certain user-customized features. A preferred embodiment of the present invention expands upon this general concept by allowing a user to customize the manner in which portlets collaborate when that particular user accesses a portal. The additional feature of allowing an adminstrative user to create wires that apply to all users allows such an administrative user to enjoy the same flexibility in producing a base portal site design.

Figure 6:
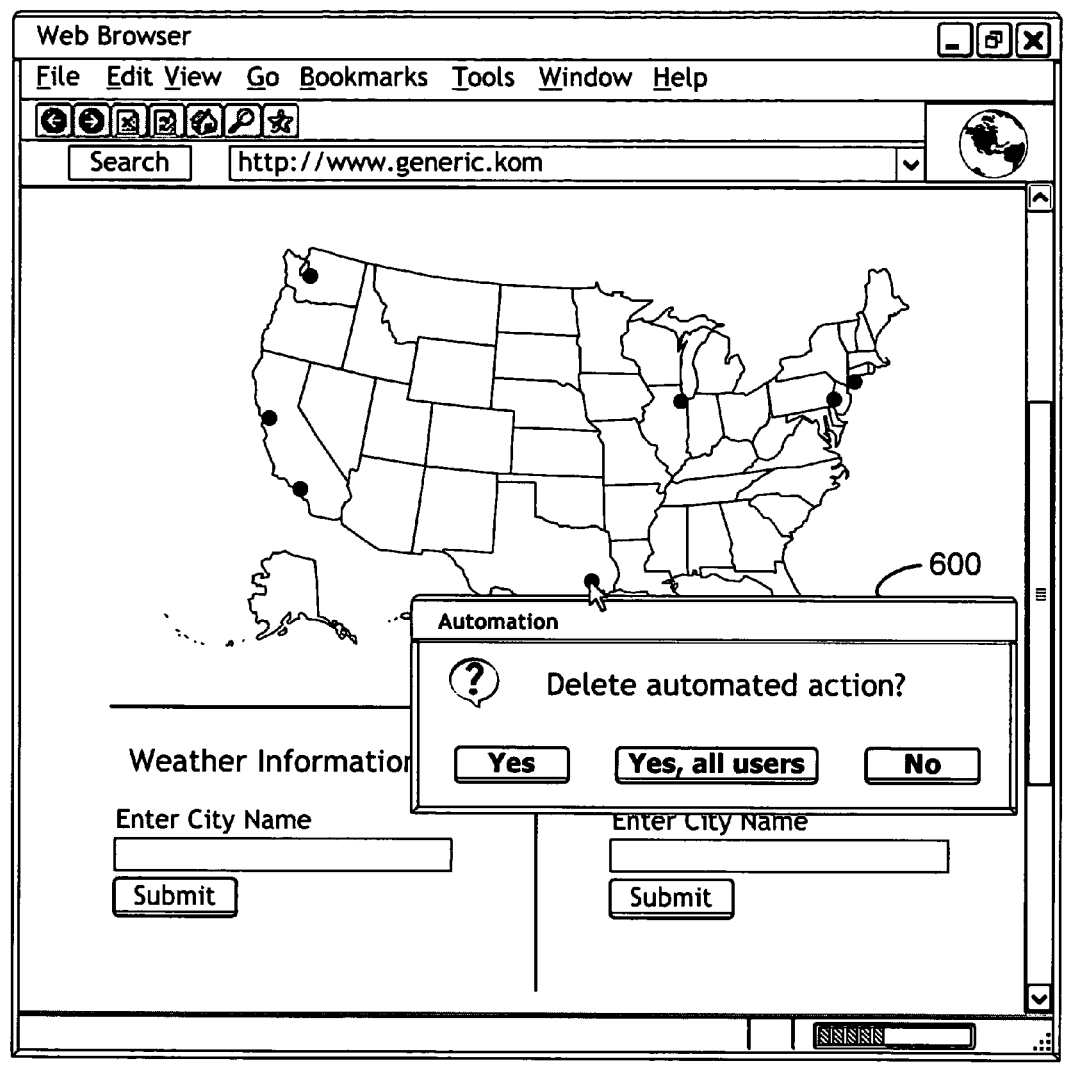
FIG. 6 is a diagram depicting a dialog box for prompting the user to specify whether to eliminate an association between a property and a portlet action in accordance with a preferred embodiment of the present invention.

In a preferred embodiment of the present invention, the reverse operation, namely deleting a wire, may be executed in a similar fashion, as shown in FIG. 6. In this example, the user has clicked a city 600 in map portlet 102 while holding down the Control key (i.e., the user has employed the alternative manner of actuating the map portlet 102's imagemap control). This Control-click operation causes a dialog box 602 to be displayed to allow the user to delete the wire associated with map portlet 102 that was created in FIG. 4.

Figure 7:
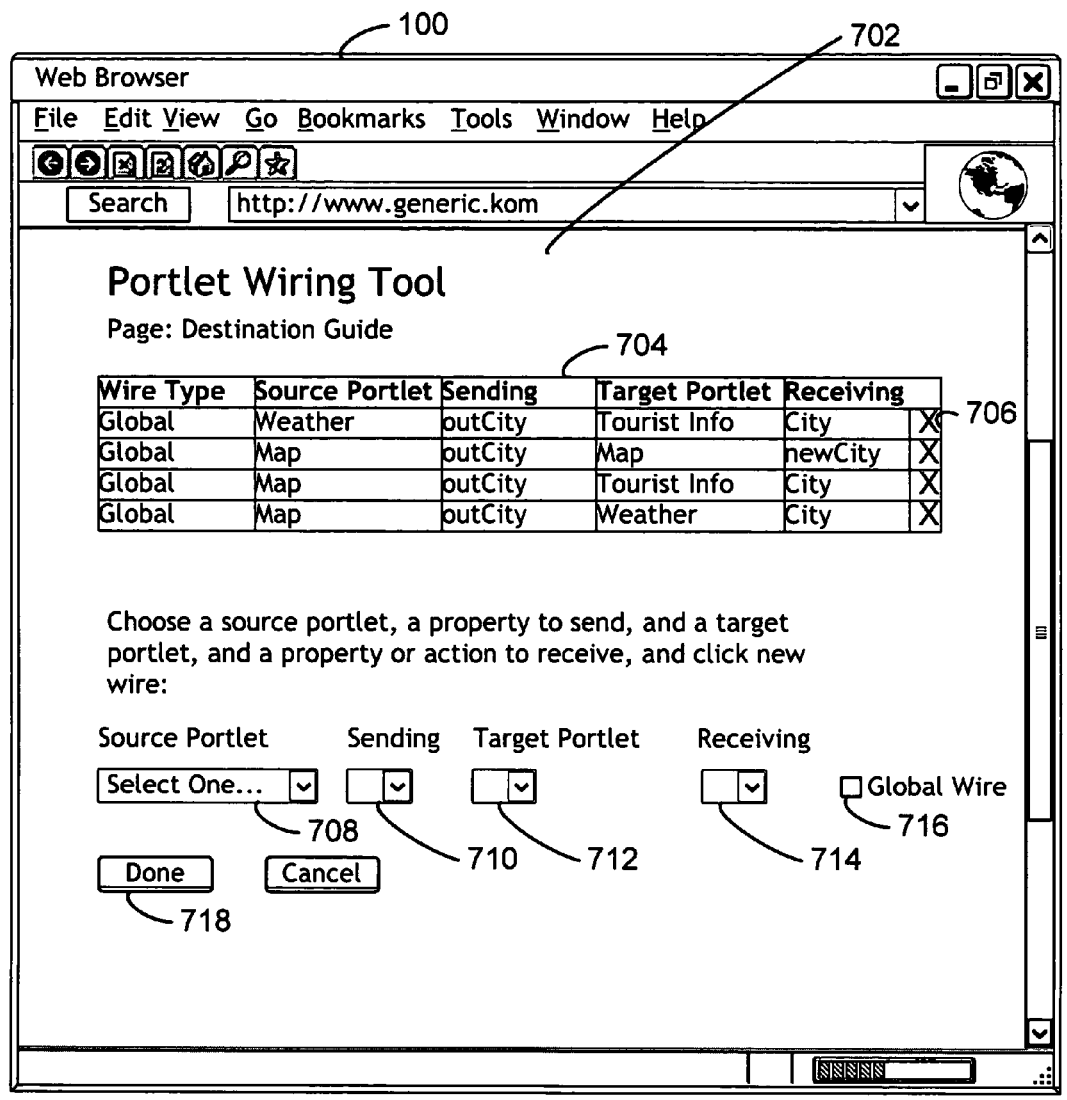
FIG. 7 is a diagram depicting a tool-based interface for making changes to the wiring of portlets in accordance with a preferred embodiment of the present invention.

The "on-the-portal" user interface for creating and deleting wires, depicted in FIGS. 3-6 may also be supplemented with a tool-based interface for creating and deleting wires, such as that described in U.S. Ser. No. 10/292,074 (DUNNE ET AL.) Nov. 12, 2003. Such an interface, tool-based interface 702, is shown in FIG. 7. An advantage of providing the option of using tool-based interface 702 is that a user has the ability to see a list 704 of all of the wires that have been created. This allows the user to understand the operation of the entire portal at a glance. Delete icons, such as delete icon 706, are provided to allow a user to delete wires from list 704. A submissable form made up of drop-down lists 708, 710, 712, and 714 allow a new wire to be specified by mapping a property (list 710) from a source portlet (list 708) to a receiving action (list 714) of a target portlet (list 712). Checkbox 716 allows an administrative user to specify whether the wire should exist for all users (i.e., that the wire should be a "global wire"). Clicking "New Wire" button 718 causes the web form to be submitted and the new wire to be created.

Figure 8:
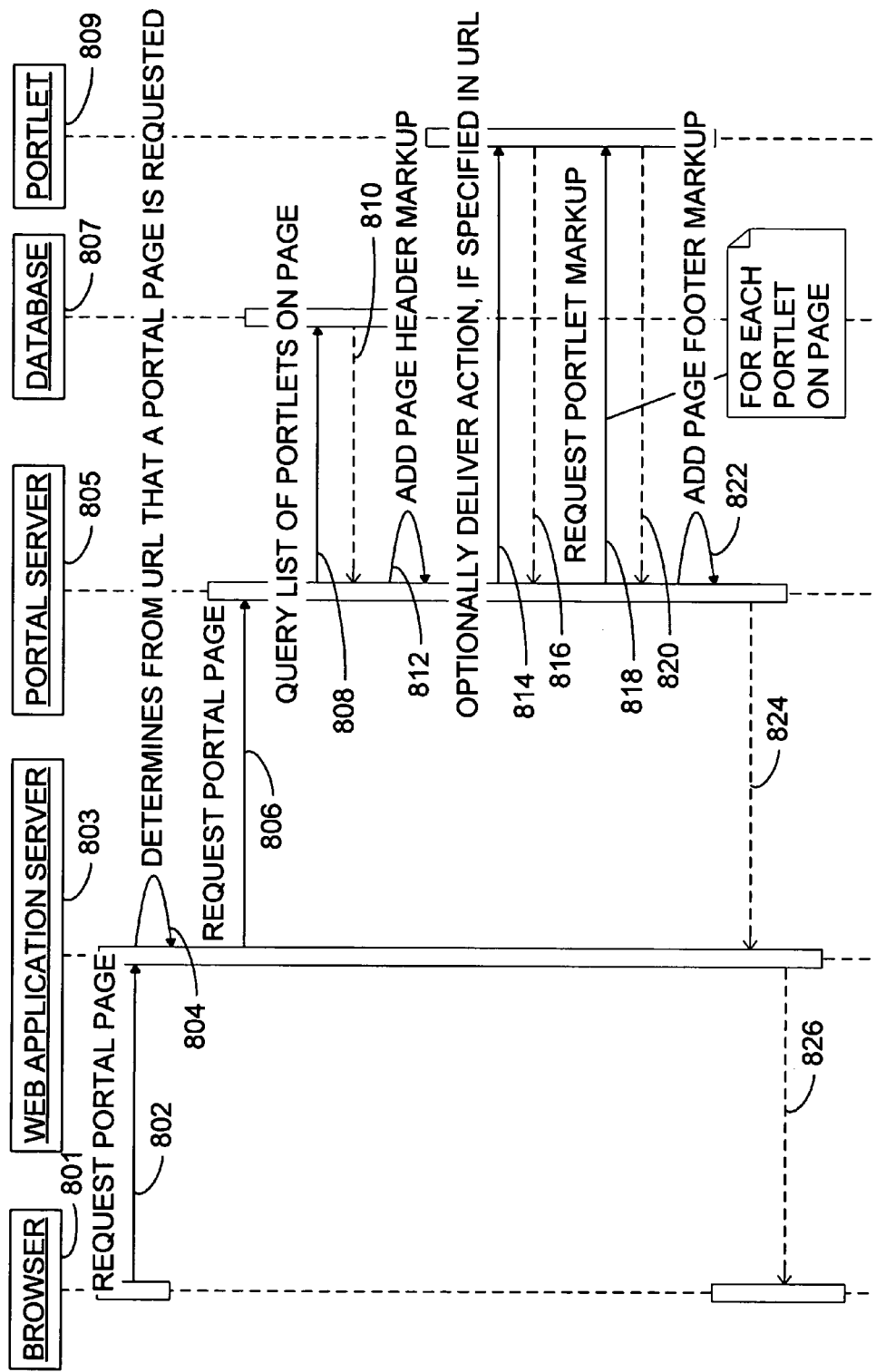
FIG. 8 is a sequence diagram depicting a process of displaying a portal page in accordance with a preferred embodiment of the present invention.

FIG. 8 is a sequence diagram in UML (Uniform Modelling Language) describing a process of displaying a portal page in accordance with a preferred embodiment of the present invention. Across the top of the sequence diagram are objects 801, 803, 805, 807, and 810, which represent the major components of a software system implementing a preferred embodiment of the present invention. It should be noted that although UML is associated with the modelling of object-oriented systems and uses object-oriented terminology, the use of UML in FIGS. 8-10 of the present application is not intended to imply that the present invention must be implemented in an object-oriented programming language or according to an object-oriented paradigm.

The depicted process begins with browser 801 requesting the portal page from web application server 803 (message 802). Web application server 803 then determines from the URL of the request that a portal page is requested (message 804). This causes web application server 803 to pass the request on to portal server 805 (message 806). Portal server 805 then queries a database 807 to determine a list of portlets present on the requested page (messages 808, 810). Database 807 (described in more detail in FIG. 12) provides information about which portlets are present on which pages and also provides information about the properties and actions associated with each portlet. Since database queries are relatively expensive operations, in a computational sense, a preferred embodiment of the present invention, in order to enhance performance, caches the results of its database queries to allow those results to be utilized without necessarily requiring that the query be actually executed in the database each time. Portal server 805 then assembles the portlets into a portlet page, adding additional markup for headers and layout and client-side scripting code as necessary (message 812).

The process of invoking the portlets themselves then begins. If a particular action for a portlet is specified in the URL of the request, an identification of that action is then delivered to the portlet (e.g., portlet 809) (messages 814, 816). Portal server 805 then requests the markup for each portlet in the page (messages 818, 820). To the obtained portlet markup, portal server adds additional markup for footers and other features that are located after the portlet markup itself in the portal page (message 822). This portal page is then returned to web application server 803 (message 824), which then serves the generated portal page as a monolithic page of markup (message 826).

Figure 9:
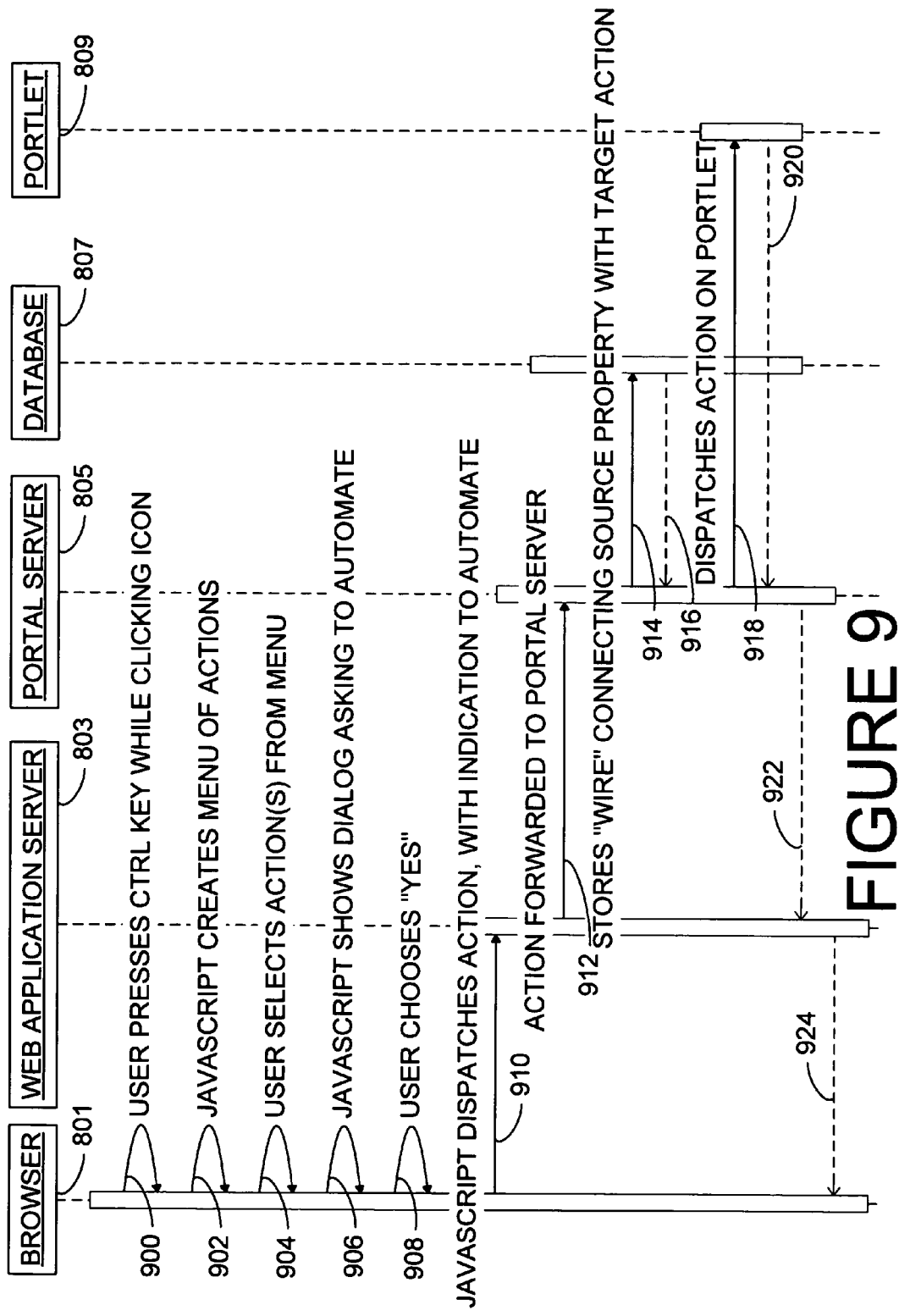
FIG. 9 is a sequence diagram depicting a process of wiring portlets in accordance with a preferred embodiment of the present invention.

FIG. 9 is a sequence diagram depicting a process of wiring portlets in accordance with a preferred embodiment of the present invention. Browser 801 executes client-side scripting code (in this example, JavaScript code) in response to the user actuating a user interface control in a portal page using the "alternative manner" of actuation to generate a wire (message 900). This client-side scripting code generates a menu of actions that can be selected by the user (as in FIG. 3) (message 902). In response to the user's selecting action(s) from the menu (message 904), the client-side scripting code then provides a dialog box asking the user whether the user wishes to have the action automated in the future (i.e., whether the user wishes to create a wire for the action) (message 906). In response to the user's choosing "Yes" (message 908), the client-side scripting code dispatches the action, along with an indication to automate the action, to web application server 803 (message 910). Web application server 803 then forwards the dispatched action to portal server 805 (message 912). This causes portal server 805 to record in database 807 wire(s) that connect the source property (associated with the clicked icon) with the chosen target action (messages 914, 916). Finally, portal server 805 dispatches the action to the appropriate portlet(s) (portlet 809) for processing (message 918), with the result returned, via portal server 805 and web application server 803, to browser 801 for display to the user (messages 920, 922, and 924).

Figure 10:
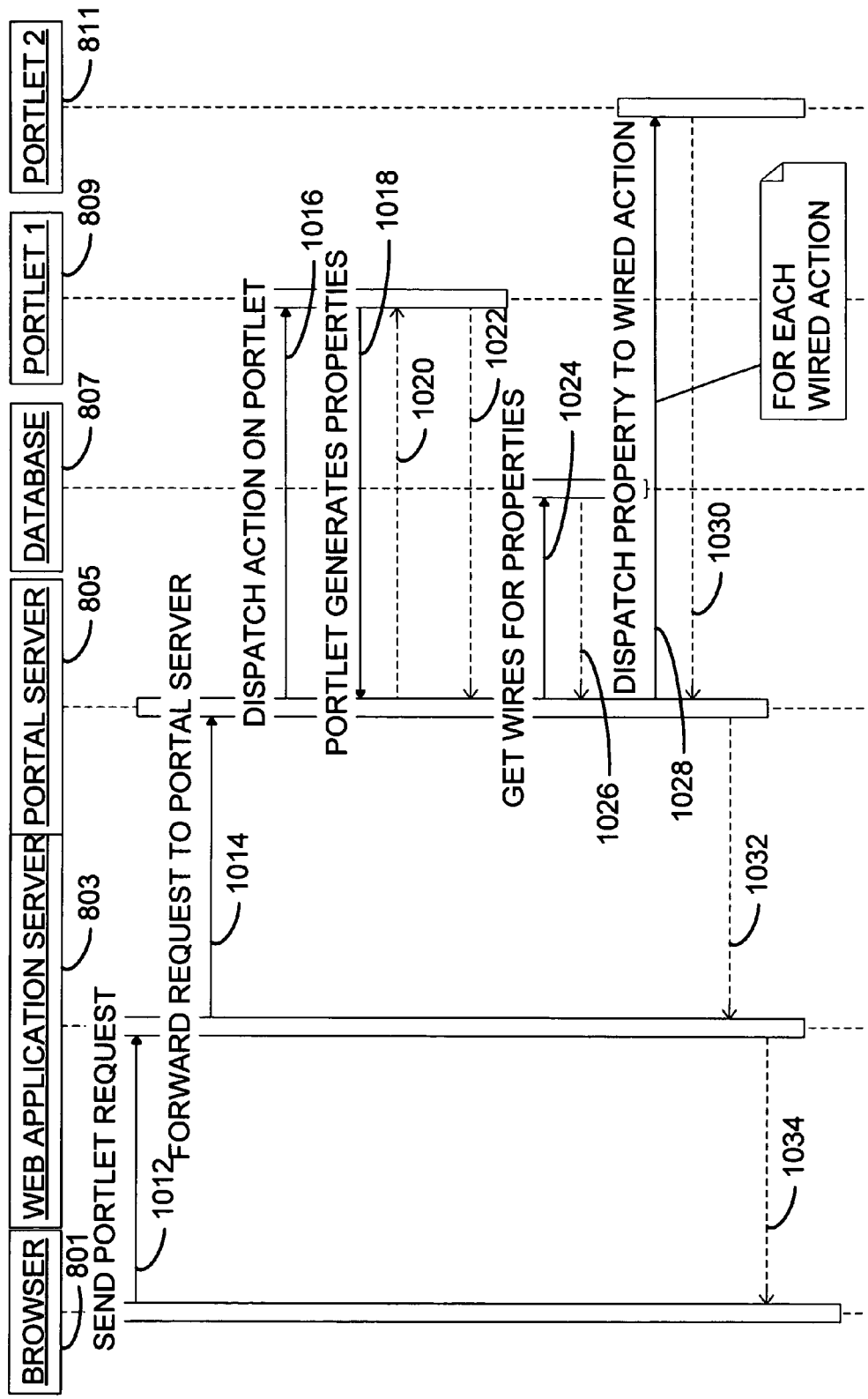
FIG. 10 is a sequence diagram depicting a process of executing actions specified by portlet wiring in accordance with a preferred embodiment of the present invention.

FIG. 10 is a sequence diagram describing a process of triggering a wired action in a portlet in accordance with a preferred embodiment of the present invention. Browser 801 submits a request to web application server 803 to perform an action on a portlet (e.g., by actuating a user interface control on the portlet) (message 1012). Web application server 803 forwards the request to portal server 805, in response to a determination that the request is directed to a portlet (message 1014). Portal server 805 then dispatches the action to a first portlet 809 for execution of the action (message 1016). Portlet 809 then generates properties (i.e., items of data) in portal server 805 as a result of executing the action (messages 1018, 1020). Once portlet 809 has completed its dispatched action (message 1022), portal server 805 queries database 807 to determine which wires (if any) are connected to the properties generated by portlet 809 (messages 1024, 1026). If any such wires exist, these properties are dispatched to the appropriate portlet(s) (represented by portlet 811) so as to perform the corresponding actions defined by the wires (messages 1028, 1030). It should be noted that this process of dispatching properties to trigger additional actions can occur repeatedly such that a transitive closure of associated actions is performed with respect to a given property (the transitive relation being the mapping of a given property to the set of properties generated by the actions triggered by the given property, as defined by the wires in database 807). Finally, the end result of performing all of the triggered actions is returned, via portal server 805 and web application server 803, to browser 801 for presentation to the user (messages 1032, 1034).

Figure 11:
FIG. 11 is a diagram providing a legend for interpreting Entity-Relationship diagrams such as FIG. 12.
Figure 11:
Figure 11:
Figure 11:
Figure 11:
Figure 11:
Figure 11:
Figure 11:
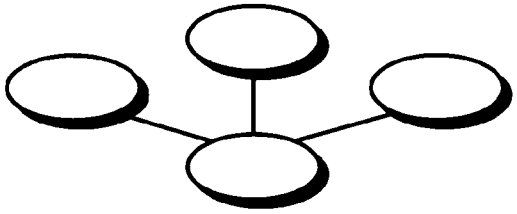
Figure 11:
Figure 11:
Figure 11:

As can be observed from FIGS. 8-10, a preferred embodiment of the present invention relies on a database (e.g., database 804) for storing information regarding the properties produced and consumed by portlets. FIG. 11 provides a diagrammatic view (in the form of an entity-relationship diagram) of a possible schema for such a database. FIG. 11 is intended to be an example of the organization of such a database and also to provide a semantic description of wires, properties, and actions.

The E-R (entity-relationship) approach to database modelling provides a semantics for the conceptual design of databases. With the E-R approach, database information is represented in terms of entities, attributes of entities, and relationships between entities, where the following definitions apply. The modelling semantics corresponding to each definition is illustrated in FIG. 11. FIG. 11 is adapted from Elmasri and Navathe, *Fundamentals of Database Systems,* 3rd Ed., Addison Wesley (2000), pp. 41-66, which contains additional material regarding E-R diagrams and is hereby incorporated herein by reference.

Entity: An entity is a principal object about which information is collected. For example, in a database containing information about personnel of a company, an entity might be Employee. In E-R modelling, an entity is represented with a box. An entity may be termed weak or strong, relating its dependence on another entity. A strong entity exhibits no dependence on another entity, i.e. its existence does not require the existence of another Entity. As shown in FIG. 11, a strong entity is represented with a single unshaded box. A weak entity derives its existence from another entity. For example, an entity "Work Time Schedule" derives its existence from an entity "Employee" if a work time schedule can only exist if it is associated with an employee. As shown in FIG. 11, a weak entity is represented by concentric boxes.

Attribute: An attribute is a label that gives a descriptive property to an entity (e.g., name, color, etc.). Two types of attributes exist. Key attributes distinguish among occurrences of an entity. For example, in the United States, a Social Security number is a key attribute that distinguishes between individuals. Descriptor attributes merely describe an entity occurrence (e.g., gender, weight). As shown in FIG. 11, in E-R modelling, an attribute is represented with an oval tied to the entity (box) to which it pertains.

In some cases, an attribute may have multiple values. For example, an entity representing a business may have a multi-valued attribute "locations." If the business has multiple locations, the attribute "locations" will have multiple values. A multi-valued attribute is represented by concentric ovals, as shown in FIG. 11. In other cases, a composite attribute may be formed from multiple grouped attributes. A composite attribute is represented by a tree structure, as shown in FIG. 11. A derived attribute is an attribute that need not be explicitly stored in a database, but may be calculated or otherwise derived from the other attributes of an entity. A derived attribute is represented by a dashed oval as shown in FIG. 11.

Relationships: A relationship is a connectivity exhibited between entity occurrences. Relationships may be one to one, one to many, and many to many, and participation in a relationship by an entity may be optional or mandatory. For example, in the database containing information about personnel of a company, a relation "married to" among employee entity occurrences is one to one (if it is stated that an employee has at most one spouse). Further, participation in the relation is optional as there may exist unmarried employees. As a second example, if company policy dictates that every employee have exactly one manager, then the relationship "managed by" among employee entity occurrences is many to one (many employees may have the same manager), and mandatory (every employee must have a manager).

As shown in FIG. 11, in E-R modelling a relationship is represented with a diamond if it relates one or more entities, and may also be represented with an n-sided polygon if it relates more than two entities. The cardinality ratio (one-to-one, one-to-many, etc.) in a relationship is denoted by the use of the characters "1" and "N" to show 1:1 or 1:N cardinality ratios, or through the use of explicit structural constraints, as shown in FIG. 11. When all instances of an entity participate in the relationship, the entity box is connected to the relationship diamond by a double line; otherwise, a single line connects the entity with the relationship, as shown in FIG. 11. In some cases, a relationship may actually identify or define one of the entities in the relationship. These identifying relationships are represented by concentric diamonds, also shown in FIG. 11.

Figure 12:
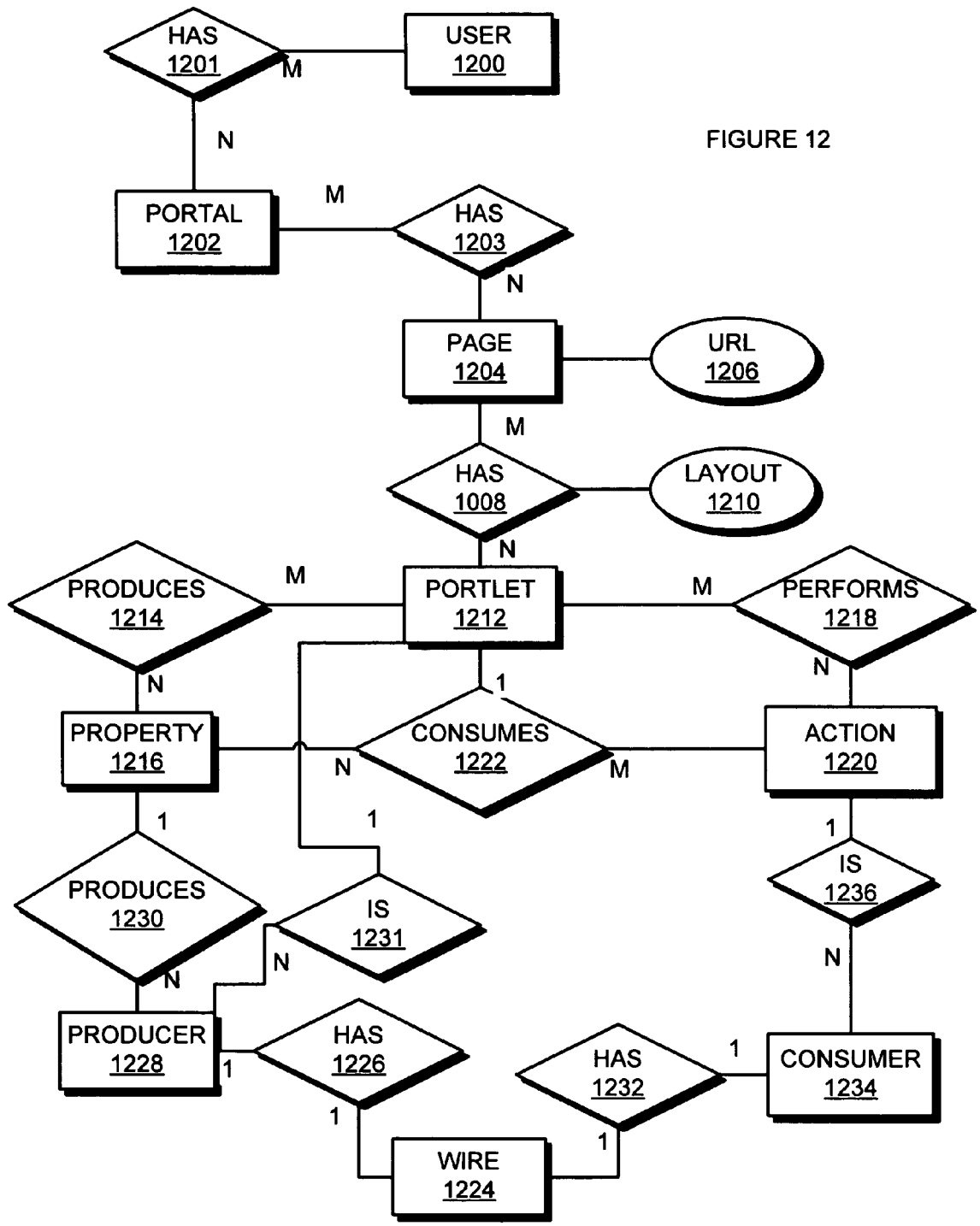
FIG. 12 is an Entity-Relationship diagram providing an exemplary schema for the database utilized in a preferred embodiment of the present invention.

FIG. 12 is an Entity-Relationship diagram providing an exemplary schema for the database (e.g., database 804) utilized in a preferred embodiment of the present invention. It should be noted that E-R modelling of databases is well-known in the database design and implementation art and that one of ordinary skill in the art would be capable of producing a variety of specific database implementations from the schema diagram provided in FIG. 12, including relational database, object-oriented database, and object-relational database implementations, as well as others. Systematic procedures and algorithms are also available to allow direct translation of an E-R schema into a semantically equivalent database implementation.

We now turn to the semantic content of FIG. 12. A portal (entity 1202) is associated (relationship 1203) with a number of pages (entity 1204), each of which is made up of (relationship 1208) portlets (entity 1212). Each page, being accessible through a web browser, has a URL (uniform resource locator) as an attribute (attribute 1206). A layout attribute 1210 is also associated with relationship 1208, providing information about the manner in which the constituent portlets are to be arranged in a portal page. Relationship 1201 maps users (entity 1200) with portals (entity 1202), since different users may have access to different portals.

Turning now to portlet entity 1212, a portlet produces (relationship 1214) properties (entity 1216) and performs (relationship 1218) various actions (entity 1220) that consume (relationship 1222) properties (entity 1216). A wire (entity 1224) maps a single "producer" (entity 1228) to a single "consumer" (entity 1234) (relationships 1226 and 1232). A "producer" (entity 1228) is (relationship 1231) a portlet (entity 1212) that produces (relationship 1230) a particular property (entity 1216), while a "consumer" (entity 1234) is (relationship 1236) an action (entity 1220) that consumes (relationship 1222) the property (entity 1216) produced by the corresponding producer (entity 1228), as associated by wire entity 1224 and relationships 1226 and 1232. A producer and consumer may be able to share a property based on some criterion associated with the property, such as a data type. A user (entity 1200) may make use of (relationship 1238) a number of wires (entity 1224).

Figure 13:
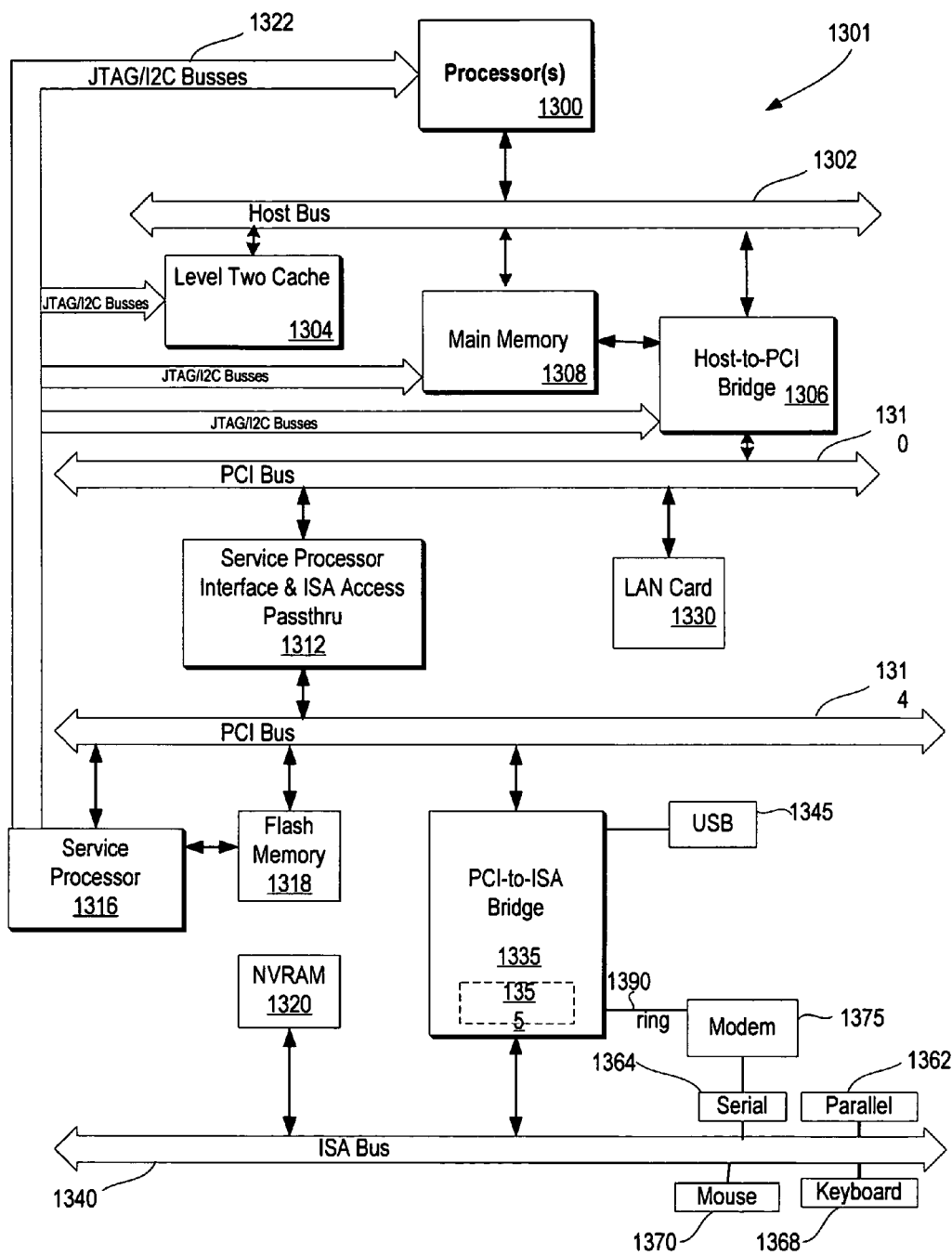
FIG. 13 is a block diagram of a computing device capable of executing software processes in accordance with a preferred embodiment of the present invention.

FIG. 13 illustrates information handling system 1301 which is a simplified example of a computer system capable of performing the computing operations described herein. Computer system 1301 includes processor 1300 which is coupled to host bus 1302. A level two (L2) cache memory 1304 is also coupled to host bus 1302. Host-to-PCI bridge 1306 is coupled to main memory 1308, includes cache memory and main memory control functions, and provides bus control to handle transfers among PCI bus 1310, processor 1300, L2 cache 1304, main memory 1308, and host bus 1302. Main memory 1308 is coupled to Host-to-PCI bridge 1306 as well as host bus 1302. Devices used solely by host processor(s) 1300, such as LAN card 1330, are coupled to PCI bus 1310. Service Processor Interface and ISA Access Pass-through 1312 provides an interface between PCI bus 1310 and PCI bus 1314. In this manner, PCI bus 1314 is insulated from PCI bus 1310. Devices, such as flash memory 1318, are coupled to PCI bus 1314. In one implementation, flash memory 1318 includes BIOS code that incorporates the necessary processor executable code for a variety of low-level system functions and system boot functions.

PCI bus 1314 provides an interface for a variety of devices that are shared by host processor(s) 1300 and Service Processor 1316 including, for example, flash memory 1318. PCI-to-ISA bridge 1335 provides bus control to handle transfers between PCI bus 1314 and ISA bus 1340, universal serial bus (USB) functionality 1345, power management functionality 1355, and can include other functional elements not shown, such as a real-time clock (RTC), DMA control, interrupt support, and system management bus support. Nonvolatile RAM 1320 is attached to ISA Bus 1340. Service Processor 1316 includes JTAG and I2C busses 1322 for communication with processor(s) 1300 during initialization steps. JTAG/I2C busses 1322 are also coupled to L2 cache 1304, Host-to-PCI bridge 1306, and main memory 1308 providing a communications path between the processor, the Service Processor, the L2 cache, the Host-to-PCI bridge, and the main memory. Service Processor 1316 also has access to system power resources for powering down information handling device 1301.

Peripheral devices and input/output (I/O) devices can be attached to various interfaces (e.g., parallel interface 1362, serial interface 1364, keyboard interface 1368, and mouse interface 1370 coupled to ISA bus 1340. Alternatively, many I/O devices can be accommodated by a super I/O controller (not shown) attached to ISA bus 1340.

In order to attach computer system 1301 to another computer system to copy files over a network, LAN card 1330 is coupled to PCI bus 1310. Similarly, to connect computer system 1301 to an ISP to connect to the Internet using a telephone line connection, modem 1375 is connected to serial port 1364 and PCI-to-ISA Bridge 1335.

While the computer system described in FIG. 13 is capable of executing the processes described herein, this computer system is simply one example of a computer system. Those skilled in the art will appreciate that many other computer system designs are capable of performing the processes described herein. It is important to note that while the present invention has been described in the context of a fully functioning data processing system, those of ordinary skill in the art will appreciate that the processes of the present invention are capable of being distributed in the form of a computer readable medium of instructions or other functional descriptive material and in a variety of other forms and that the present invention is equally applicable regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system. Functional descriptive material is information that imparts functionality to a machine. Functional descriptive material includes, but is not limited to, computer programs, instructions, rules, facts, definitions of computable functions, objects, and data structures.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that is a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles a or an limits any particular claim containing such introduced claim element to inventions containing only one such element, even when the same claim includes the introductory phrases "one or more" or "at least one" and indefinite articles such as "a" or "an"; the same holds true for the use in the claims of definite articles.

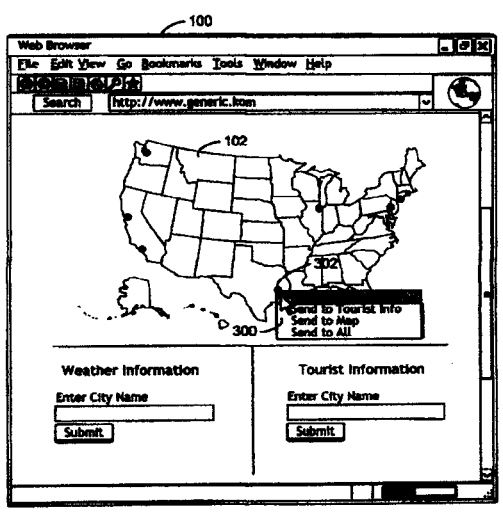

The invention claimed is:

1. A computer-implemented method comprising:
    registering one or more portlet actions corresponding to a plurality of portlets within a portal infrastructure, wherein a first set of one or more of the plurality of portlets are providers of a particular property and wherein a second set of one or more of the plurality of portlets are consumers of the particular property;
    assembling a portal page for presentation in a browser, wherein the portal page includes interfaces from the plurality of portlets; and
    including in the portal page a user interface control associated with the particular property, wherein the user interface control, when actuated in a particular manner of actuation by an end user, allows the end user to associate the particular property from one or more of the first set of portlets with at least one of the portlets from the second set of portlets such that an occurrence of a subsequent event associated with the particular property causes one or more portlet actions to be executed wherein the particular property is provided from the one or more associated first set of portlets to the one or more associated second set of portlets.

2. The method of claim 1, wherein the subsequent event associated with the particular property is a subsequent actuation of the user interface control.

3. The method of claim 1, further comprising:
    storing, in persistent storage, an association between the particular property and the at least one of the one or more portlet actions;
    retrieving the association in response to an occurrence of an event associated with the particular property; and
    executing the at least one of the one or more portlet actions in response to retrieving the association.

4. The method of claim 1, wherein said particular manner of actuation includes concurrent keypress and pointing-device click events.

5. The method of claim 1, wherein assembling the portal page includes attaching client-side scripting code to the portal page such that execution of the client-side scripting code is triggered by said particular manner of actuation, and wherein the client-side scripting code is programmed to prompt the end user to specify whether the end user desires to associate one or more portlet actions with said particular property.

6. The method of claim 5, wherein the client-side scripting code prompts the end user by displaying a dialog box.

7. The method of claim 1, further comprising:
allowing the end user to disassociate said particular property from said at least one of the one or more portlet actions in response to a subsequent actuation of the user interface control.

8. A computer program product comprising a computer-recordable medium encoded with functional descriptive material that, when executed by a computer, causes the computer to perform actions of:
registering one or more portlet actions corresponding to a plurality of portlets within a portal infrastructure, wherein a first set of one or more of the plurality of portlets are providers of a particular property and wherein a second set of one or more of the plurality of portlets are consumers of the particular property;
assembling a portal page for presentation in a browser, wherein the portal page includes interfaces from the plurality of portlets; and
including in the portal page a user interface control associated with the particular property, wherein the user interface control, when actuated in a particular manner of actuation by an end user, allows the end user to associate the particular property from one or more of the first set of portlets with at least one of the portlets from the second set of portlets such that an occurrence of a subsequent event associated with the particular property causes one or more portlet actions to be executed wherein the particular property is provided from one of the associated first set of portlets to the one or more associated second set of portlets.

9. The computer program product of claim 8, wherein the subsequent event associated with the particular property is a subsequent actuation of the user interface control.

10. The computer program product of claim 8, comprising additional functional descriptive material that, when executed by the computer, causes the computer to perform additional actions of:
storing, in persistent storage, an association between the particular property and the at least one of the one or more portlet actions;
retrieving the association in response to an occurrence of an event associated with the particular property; and
executing the at least one of the one or more portlet actions in response to retrieving the association.

11. The computer program product of claim 8, wherein said particular manner of actuation includes concurrent keypress and pointing-device click events.

12. The computer program product of claim 8, wherein assembling the portal page includes attaching client-side scripting code to the portal page such that execution of the client-side scripting code is triggered by said particular manner of actuation, and wherein the client-side scripting code is programmed to prompt the end user to specify whether the end user desires to associate one or more portlet actions with said particular property.

13. The computer program product of claim 12, wherein the client-side scripting code prompts the end user by displaying a dialog box.

14. The computer program product of claim 8, comprising additional functional descriptive material that, when executed by the computer, causes the computer to perform additional actions of:
allowing the end user to disassociate said particular property from said at least one of the one or more portlet actions in response to a subsequent actuation of the user interface control.

15. A data processing system comprising:
one or more processors;
a memory accessible by the processors;
a persistent storage accessible by the processors; and
a portlet management software tool executed by the processors, the portlet management tool including steps effective to:
register one or more portlet actions for one or more portlets within a portal infrastructure actions corresponding to a plurality of portlets within a portal infrastructure, wherein a first set of one or more of the plurality of portlets are providers of a particular property and wherein a second set of one or more of the plurality of portlets are consumers of the particular property;
assemble a portal page for presentation in a browser, wherein the portal page includes interfaces from the plurality of portlets;
include in the portal page a user interface control associated with the particular property, wherein the user interface control, when actuated in a particular manner of actuation by an end user, allows the end user to associate the particular property from one or more of the first set of portlets with at least one of the portlets from the second set of portlets such that an occurrence of a subsequent event associated with the particular property causes one or more portlet actions to be executed wherein the particular property is provided from the one or more associated first set of portlets to the one or more associated second set of portlets.

16. The data processing system of claim 15, wherein the subsequent event associated with the particular property is a subsequent actuation of the user interface control.

17. The data processing system of claim 15, wherein the portlet management tool further includes steps effective to:
store, in the persistent storage, an association between the particular property and the at least one of the one or more portlet actions;
retrieve the association in response to an occurrence of an event associated with the particular property; and
execute, by one of the processors, the at least one of the one or more portlet actions in response to retrieving the association.

18. The data processing system of claim 15, wherein said particular manner of actuation includes concurrent keypress and pointing-device click events.

19. The data processing system of claim 15, wherein assembling the portal page includes attaching client-side scripting code to the portal page such that execution of the client-side scripting code is triggered by said particular manner of actuation, and wherein the client-side scripting code is programmed to prompt the end user to specify whether the end user desires to associate one or more portlet actions with said particular property.

20. The data processing system of claim 15, wherein the portlet management tool further includes steps effective to:
allow the end user to disassociate said particular property from said at least one of the one or more portlet actions in response to a subsequent actuation of the user interface control.

* * * * *

UNITED STATES PATENT AND TRADEMARK OFFICE
CERTIFICATE OF CORRECTION

PATENT NO. : 7,376,739 B2
APPLICATION NO. : 10/776040
DATED : May 20, 2008
INVENTOR(S) : Ramaswamy et al.

It is certified that error appears in the above-identified patent and that said Letters Patent is hereby corrected as shown below:

Please delete claims 8-20.

Signed and Sealed this
Fifteenth Day of February, 2011

David J. Kappos
*Director of the United States Patent and Trademark Office*

UNITED STATES PATENT AND TRADEMARK OFFICE
CERTIFICATE OF CORRECTION

PATENT NO.       : 7,376,739 B2
APPLICATION NO.  : 10/776040
DATED            : May 20, 2008
INVENTOR(S)      : Ramaswamy et al.

It is certified that error appears in the above-identified patent and that said Letters Patent is hereby corrected as shown below:

Delete the title page and substitute therefore the attached title page showing the corrected number of claims in patent.

Column 15, line 6 - Column 16, line 64, please delete claims 8-20.

This certificate supersedes the Certificate of Correction issued February 15, 2011.

Signed and Sealed this
Fifteenth Day of March, 2011

David J. Kappos
*Director of the United States Patent and Trademark Office*

(12) United States Patent
Ramaswamy et al.

(10) Patent No.: US 7,376,739 B2
(45) Date of Patent: May 20, 2008

(54) PERSISTENCE OF INTER-APPLICATION COMMUNICATION PATTERNS AND BEHAVIOR UNDER USER CONTROL

(75) Inventors: Shankar Ramaswamy, Chapel Hill, NC (US); Amber Roy-Chowdhury, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 747 days.

(21) Appl. No.: 10/776,040

(22) Filed: Feb. 11, 2004

(65) Prior Publication Data
US 2005/0175015 A1 Aug. 11, 2005

(51) Int. Cl.
G06F 15/16 (2006.01)
G06F 15/173 (2006.01)
G06F 9/44 (2006.01)
G06F 9/46 (2006.01)
G06F 3/048 (2006.01)
G06F 17/30 (2006.01)
G06F 3/00 (2006.01)
G06F 13/00 (2006.01)
G06F 15/00 (2006.01)
G06F 17/00 (2006.01)
G06F 7/00 (2006.01)

(52) U.S. Cl. ............... 709/226; 709/218; 709/219; 709/249; 719/328; 715/749; 715/760; 715/811; 707/10

(58) Field of Classification Search ........ 709/217–219, 709/226, 229, 249; 719/328; 715/513, 514, 715/704, 749, 760, 809–813; 707/10
See application file for complete search history.

(56) References Cited

U.S. PATENT DOCUMENTS 6,918,088 B2 * 7/2005 Clark et al. ............... 715/742

(Continued)

FOREIGN PATENT DOCUMENTS

EP 961452 A2 * 12/1999

(Continued)

OTHER PUBLICATIONS

Abdelnur, Alejandro and Hepper, Stefan. "Java Portlet Specification, Version 1.0," Oct. 7, 2003, pp. 1-132.*

(Continued)

Primary Examiner—Jason D Cardone
Assistant Examiner—Melvin H Pollack
(74) Attorney, Agent, or Firm—VanLeeuwen & VanLeeuwen; Andre M. Gibbs

(57) ABSTRACT

An end-user or administrator is allowed to couple portlets in a portal through user interface events taking place on the portal display itself. When the portal is displayed, if the user actuates a control corresponding to a property in a portlet, a menu of actions that can be performed with that data by other portlets is provided to the user. In addition to this "conventional" manner, an alternative manner of actuating the component is provided to the user such that if the user actuates the control in this alternative manner, the user is provided the option of making the chosen action "persistent," so that the next time the control is actuated by the user, or the associated property is otherwise produced, the chosen action is performed automatically, without requiring the user to choose an action.

7 Claims, 13 Drawing Sheets